US011106720B2

(12) United States Patent
Green

(10) Patent No.: US 11,106,720 B2
(45) Date of Patent: *Aug. 31, 2021

(54) SYSTEMS AND METHODS FOR CLUSTERING ITEMS ASSOCIATED WITH INTERACTIONS

(71) Applicant: Facebook, Inc., Menlo Park, CA (US)

(72) Inventor: Bradley Ray Green, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/283,587

(22) Filed: Feb. 22, 2019

(65) Prior Publication Data

US 2019/0188220 A1 Jun. 20, 2019

Related U.S. Application Data

(63) Continuation of application No. 14/585,590, filed on Dec. 30, 2014, now Pat. No. 10,255,358.

(51) Int. Cl.
*G06F 16/38* (2019.01)
*G06F 16/9535* (2019.01)
*G06Q 50/00* (2012.01)

(52) U.S. Cl.
CPC .......... *G06F 16/38* (2019.01); *G06F 16/9535* (2019.01); *G06Q 50/01* (2013.01)

(58) Field of Classification Search
CPC ...... G06F 16/38; G06F 16/9535; G06Q 50/01
USPC ........................................................ 707/738
See application file for complete search history.

(56) References Cited

U.S. PATENT DOCUMENTS

| 6,247,154 | B1 | 6/2001 | Bushnell | |
|---|---|---|---|---|
| 6,502,091 | B1 | 12/2002 | Chundi | |
| 7,653,605 | B1 | 1/2010 | Jackson | |
| 7,673,340 | B1 | 3/2010 | Cohen | |
| 7,693,903 | B2 | 4/2010 | Potok | |
| 8,099,417 | B2* | 1/2012 | Gollapudi | G06F 16/951 707/748 |
| 8,386,495 | B1 | 2/2013 | Sandler | |
| 8,423,538 | B1* | 4/2013 | Sadikov | G06F 16/285 707/722 |
| 8,515,975 | B1* | 8/2013 | Federici | G06F 16/903 707/751 |

(Continued)

OTHER PUBLICATIONS

Ma et al., "Mining Web Graphs for Recommendations," IEEE Transactions on Knowledge and Data Engineering, vol. 24, No. 6, Jun. 2012, pp. 1051-1064. (Year: 2012).*

(Continued)

*Primary Examiner* — Phuong Thao Cao
(74) *Attorney, Agent, or Firm* — Sheppard Mullin Richter & Hampton LLP

(57) ABSTRACT

Systems, methods, and non-transitory computer readable media configured to generate session information based on information regarding items of a plurality of item types associated with interactions performed by active users of a social networking system. A graph is generated based on the session information. At least a first item of the items is assigned to a cluster based on similarity between the item and the cluster. The cluster is provided to a recommender system to facilitate selection of relevant information for potential presentation to a user.

20 Claims, 7 Drawing Sheets

(56) References Cited

U.S. PATENT DOCUMENTS

| | | | |
|---|---|---|---|
| 8,566,339 B2* | 10/2013 | Jammalamadaka | G06F 16/951 707/767 |
| 8,606,787 B1 | 12/2013 | Asgekar | |
| 8,626,835 B1 | 1/2014 | Gyongyi | |
| 8,689,108 B1 | 4/2014 | Duffield | |
| 8,751,520 B1 | 6/2014 | Bhattacharjee | |
| 8,898,150 B1 | 11/2014 | Kuramochi | |
| 9,026,537 B1 | 5/2015 | Asgekar | |
| 9,122,758 B1 | 9/2015 | Blower | |
| 9,147,273 B1* | 9/2015 | Allen | G06T 11/206 |
| 9,165,255 B1 | 10/2015 | Shetty | |
| 9,176,639 B1 | 11/2015 | Barros | |
| 9,183,259 B1* | 11/2015 | Marra | G06F 16/9535 |
| 9,286,391 B1 | 3/2016 | Dykstra | |
| 9,344,390 B1 | 5/2016 | Chandrasekar | |
| 9,361,446 B1 | 6/2016 | Demirjian | |
| 9,424,668 B1 | 8/2016 | Petrou | |
| 9,672,291 B2 | 6/2017 | Aharony | |
| 9,760,609 B2 | 9/2017 | Kelley | |
| 10,129,276 B1* | 11/2018 | Raviv | H04L 63/1441 |
| 2003/0182612 A1 | 9/2003 | Tsuchie | |
| 2005/0125276 A1 | 6/2005 | Rusu | |
| 2005/0134587 A1 | 6/2005 | Geiger | |
| 2005/0283487 A1 | 12/2005 | Karlsson | |
| 2006/0074870 A1* | 4/2006 | Brill | G06F 16/3328 |
| 2006/0088095 A1 | 4/2006 | Choi | |
| 2006/0224898 A1 | 10/2006 | Ahmed | |
| 2007/0100623 A1 | 5/2007 | Hentschel | |
| 2007/0220037 A1 | 9/2007 | Srivastava | |
| 2007/0282785 A1 | 12/2007 | Fayyad | |
| 2008/0059521 A1 | 3/2008 | Hutson | |
| 2008/0075280 A1 | 3/2008 | Ye | |
| 2008/0140643 A1 | 6/2008 | Ismalon | |
| 2008/0215416 A1 | 9/2008 | Ismalon | |
| 2008/0275902 A1 | 11/2008 | Burges | |
| 2009/0106184 A1* | 4/2009 | Lang | G06Q 30/02 706/59 |
| 2009/0228296 A1 | 9/2009 | Ismalon | |
| 2010/0095215 A1 | 4/2010 | Elven | |
| 2010/0161643 A1* | 6/2010 | Gionis | G06F 16/24534 707/765 |
| 2010/0211588 A1 | 8/2010 | Jiang | |
| 2010/0268830 A1 | 10/2010 | McKee | |
| 2010/0281029 A1 | 11/2010 | Parikh | |
| 2011/0040768 A1 | 2/2011 | Shon | |
| 2011/0145093 A1 | 6/2011 | Paradise | |
| 2011/0145226 A1 | 6/2011 | Gollapudi | |
| 2011/0208730 A1* | 8/2011 | Jiang | G06F 16/951 707/727 |
| 2011/0249572 A1 | 10/2011 | Singhal | |
| 2011/0307321 A1 | 12/2011 | Tangney | |
| 2011/0313844 A1 | 12/2011 | Chandramouli | |
| 2012/0066243 A1 | 3/2012 | Jammalamadaka | |
| 2012/0079020 A1 | 3/2012 | Park | |
| 2012/0254080 A1 | 10/2012 | Bhatnagar | |
| 2012/0260205 A1 | 10/2012 | Rusu | |
| 2012/0271860 A1 | 10/2012 | Graham, Jr. | |
| 2013/0073979 A1 | 3/2013 | Shepherd | |
| 2013/0117261 A1 | 5/2013 | Sambrani | |
| 2013/0198203 A1 | 8/2013 | Bates | |
| 2014/0067439 A1 | 3/2014 | Bosworth | |
| 2014/0082480 A1* | 3/2014 | Ionescu | G06F 40/103 715/234 |
| 2014/0188992 A1 | 7/2014 | Jayawardane | |
| 2014/0189525 A1 | 7/2014 | Trevisiol | |
| 2014/0214936 A1 | 7/2014 | Abraham | |
| 2014/0258187 A1 | 9/2014 | Suleiman | |
| 2014/0278896 A1 | 9/2014 | Anand | |
| 2014/0279618 A1 | 9/2014 | Li | |
| 2014/0280143 A1 | 9/2014 | Milenova | |
| 2015/0052135 A1 | 2/2015 | Calkowski | |
| 2015/0081656 A1 | 3/2015 | Wang | |
| 2015/0081725 A1 | 3/2015 | Ogawa | |
| 2015/0088911 A1 | 3/2015 | Qiao | |
| 2015/0089424 A1* | 3/2015 | Duffield | G06F 3/0484 715/771 |
| 2015/0095185 A1 | 4/2015 | Katukuri | |
| 2015/0120432 A1 | 4/2015 | Wang | |
| 2015/0169758 A1 | 6/2015 | Assom | |
| 2015/0172854 A1 | 6/2015 | Stogaitis | |
| 2015/0178284 A1* | 6/2015 | Garg | G06F 16/3323 707/748 |
| 2015/0179166 A1 | 6/2015 | Nagao | |
| 2015/0212922 A1 | 7/2015 | Nakata | |
| 2015/0220530 A1 | 8/2015 | Banadaki | |
| 2015/0234939 A1 | 8/2015 | Aharony | |
| 2015/0347543 A1 | 12/2015 | Sinha | |
| 2016/0063506 A1 | 3/2016 | Hicks | |
| 2016/0071162 A1 | 3/2016 | Ogawa | |
| 2016/0078148 A1 | 3/2016 | Werneck | |
| 2016/0147892 A1* | 5/2016 | Gilbert | G06F 16/9535 707/738 |
| 2016/0164982 A1 | 6/2016 | LeBeau | |
| 2016/0179835 A1 | 6/2016 | Mika | |
| 2016/0188713 A1 | 6/2016 | Green | |
| 2016/0188725 A1 | 6/2016 | Wang | |
| 2017/0091537 A1 | 3/2017 | Wnuk | |
| 2017/0359584 A1 | 12/2017 | Said | |
| 2018/0293607 A1 | 10/2018 | Huddleston | |

OTHER PUBLICATIONS

Wu et al., "Balancing a Complete Signed Graph by Editing Edges and Deleting Nodes," in Chang et al. (Eds.): Advances in Intelligent Systems & Applications, vol. 1, Smart Innovation Systems and Technology (SIST), vol. 20, pp. 79-88 (Year: 2013).

Benevenuto et al., "Characterizing User Behavior in Online Social Networks," in Proceedings of the 9th ACM SIGCOMM Conference on Internet Measurement, Nov. 4-6, 2009, Chicago, Illinois, USA, pp. 49-62. (Year: 2009).

Newman M. E. J., "Analysis of Weighted Networks," Physical Review E, vol. 70, Issue 5, 2004, pp. 056131: 1-9. (Year: 2004).

Roth et al., "Suggesting Friends Using the Implicit Social Graph," in Proceedings of the 16th ACM SIGKDD International Conference on Knowledge Discovery and Data Mining, Jul. 25-28, 2010, Washington, DC, USA, pp. 233-241. (Year: 2010).

* cited by examiner

400

```
┌─────────────────────────────────────────────────────────────────────┐
│ Generate session information based on information regarding items   │
│ of a plurality of item types associated with interactions performed │
│ by active users of a social networking system                       │
│                              402                                    │
└─────────────────────────────────────────────────────────────────────┘
                                  │
                                  ▼
┌─────────────────────────────────────────────────────────────────────┐
│              Generate a graph based on the session information      │
│                              404                                    │
└─────────────────────────────────────────────────────────────────────┘
                                  │
                                  ▼
┌─────────────────────────────────────────────────────────────────────┐
│ Assign at least a first item of the items to a cluster based on     │
│ similarity between the item and the cluster                         │
│                              406                                    │
└─────────────────────────────────────────────────────────────────────┘
                                  │
                                  ▼
┌─────────────────────────────────────────────────────────────────────┐
│ Provide the cluster to a recommender system to facilitate selection │
│ of relevant information for potential presentation to a user        │
│                              408                                    │
└─────────────────────────────────────────────────────────────────────┘
```

```
┌─────────────────────────────────────────────────────────────────────────┐
│ Generate session information based on information regarding items of a  │
│ plurality of item types associated with interactions performed by active│
│ users of a social networking system                                     │
│ 502                                                                     │
└─────────────────────────────────────────────────────────────────────────┘
                                    │
                                    ▼
┌─────────────────────────────────────────────────────────────────────────┐
│ Limit the information regarding items of a plurality of item types by   │
│ at least one of a number of the active users and a number of            │
│ interactions associated with the active users                           │
│ 504                                                                     │
└─────────────────────────────────────────────────────────────────────────┘
                                    │
                                    ▼
┌─────────────────────────────────────────────────────────────────────────┐
│ Remove noise in the session information                                 │
│ 506                                                                     │
└─────────────────────────────────────────────────────────────────────────┘
                                    │
                                    ▼
┌─────────────────────────────────────────────────────────────────────────┐
│ Generate a graph based on the session information                       │
│ 508                                                                     │
└─────────────────────────────────────────────────────────────────────────┘
                                    │
                                    ▼
┌─────────────────────────────────────────────────────────────────────────┐
│ Rebalance edges of a node of the graph to optimize memory usage in      │
│ storage of the graph                                                    │
│ 510                                                                     │
└─────────────────────────────────────────────────────────────────────────┘
                                    │
                                    ▼
┌─────────────────────────────────────────────────────────────────────────┐
│ Determine a similarity score between a first item of the items and a    │
│ representative item of a cluster and determine whether the similarity   │
│ score satisfies a threshold value                                       │
│ 512                                                                     │
└─────────────────────────────────────────────────────────────────────────┘
                                    │
                                    ▼
┌─────────────────────────────────────────────────────────────────────────┐
│ Assign the first item to the cluster based on similarity between the    │
│ item and the cluster                                                    │
│ 514                                                                     │
└─────────────────────────────────────────────────────────────────────────┘
                                    │
                                    ▼
┌─────────────────────────────────────────────────────────────────────────┐
│ Provide the cluster to a recommender system to facilitate selection of  │
│ relevant information for potential presentation to a user               │
│ 516                                                                     │
└─────────────────────────────────────────────────────────────────────────┘
```

FIGURE 5

SYSTEMS AND METHODS FOR CLUSTERING ITEMS ASSOCIATED WITH INTERACTIONS

CROSS-REFERENCE TO RELATED APPLICATIONS

This application is a continuation of U.S. patent application Ser. No. 14/585,590, currently issued as U.S. Pat. No. 10,255,358 filed on Dec. 30, 2014 and entitled "SYSTEMS AND METHODS FOR CLUSTERING ITEMS ASSOCIATED WITH INTERACTIONS", which is incorporated herein by reference in its entirety.

FIELD OF THE INVENTION

The present technology relates to the field of content provision. More particularly, the present technology relates to techniques for clustering items associated with interactions of a social networking system.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, a user may navigate to or be presented with various content items in a social network. The content items can come from pages associated with members of the social network. In some instances, the content items may be of high interest to the user. If the user expresses interest in a particular content item, the social network may attempt, based on the content item, to provide to the user additional content items that likewise would be of high interest to the user. Provision of additional content items that are of high interest to the user enhances user experience and can help realize the full potential of the social network. Unfortunately, attempts to provide such additional content items and to maintain a high level of interest from the user often fail.

SUMMARY

Various embodiments of the present disclosure can include systems, methods, and non-transitory computer readable media configured to generate session information based on information regarding items of a plurality of item types associated with interactions performed by active users of a social networking system. A graph is generated based on the session information. At least a first item of the items is assigned to a cluster based on similarity between the item and the cluster. The cluster is provided to a recommender system to facilitate selection of relevant information for potential presentation to a user.

In an embodiment, the plurality of item types include at least one of other users, profiles, groups, pages, hashtags, topics, links, photos, and search terms.

In an embodiment, the session information is based on a user or a post.

In an embodiment, the information regarding items of a plurality of item types is limited by at least one of a threshold number of the active users and a threshold number of interactions associated with the active users.

In an embodiment, noise in the session information is removed based on at least one of spending less than a first threshold amount of time for each interaction, activity for more than a second threshold amount of time for a session, and engagement in a cycle of interaction.

In an embodiment, edges of a node of the graph are rebalanced to optimize memory usage in storage of the graph.

In an embodiment, the rebalancing edges of a node of the graph further comprises multiplying transition probabilities between the node and each of connected nodes by a constant value when the total count of edges for the node satisfies a threshold value.

In an embodiment, the constant value is based on a threshold value divided by a transition probability of a k-th largest connected node by weight when the transition probability is greater than the threshold value.

In an embodiment, a similarity score between the first item and a representative item of the cluster is determined. It is determined whether the similarity score satisfies a threshold value.

In an embodiment, bi-directional agreement between the first item and a representative item of the cluster interact and internal cohesion of the cluster are determined.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates a first example method, according to an embodiment of the present disclosure.

FIG. 5 illustrates a second example method, according to an embodiment of the present disclosure.

Figure 1:
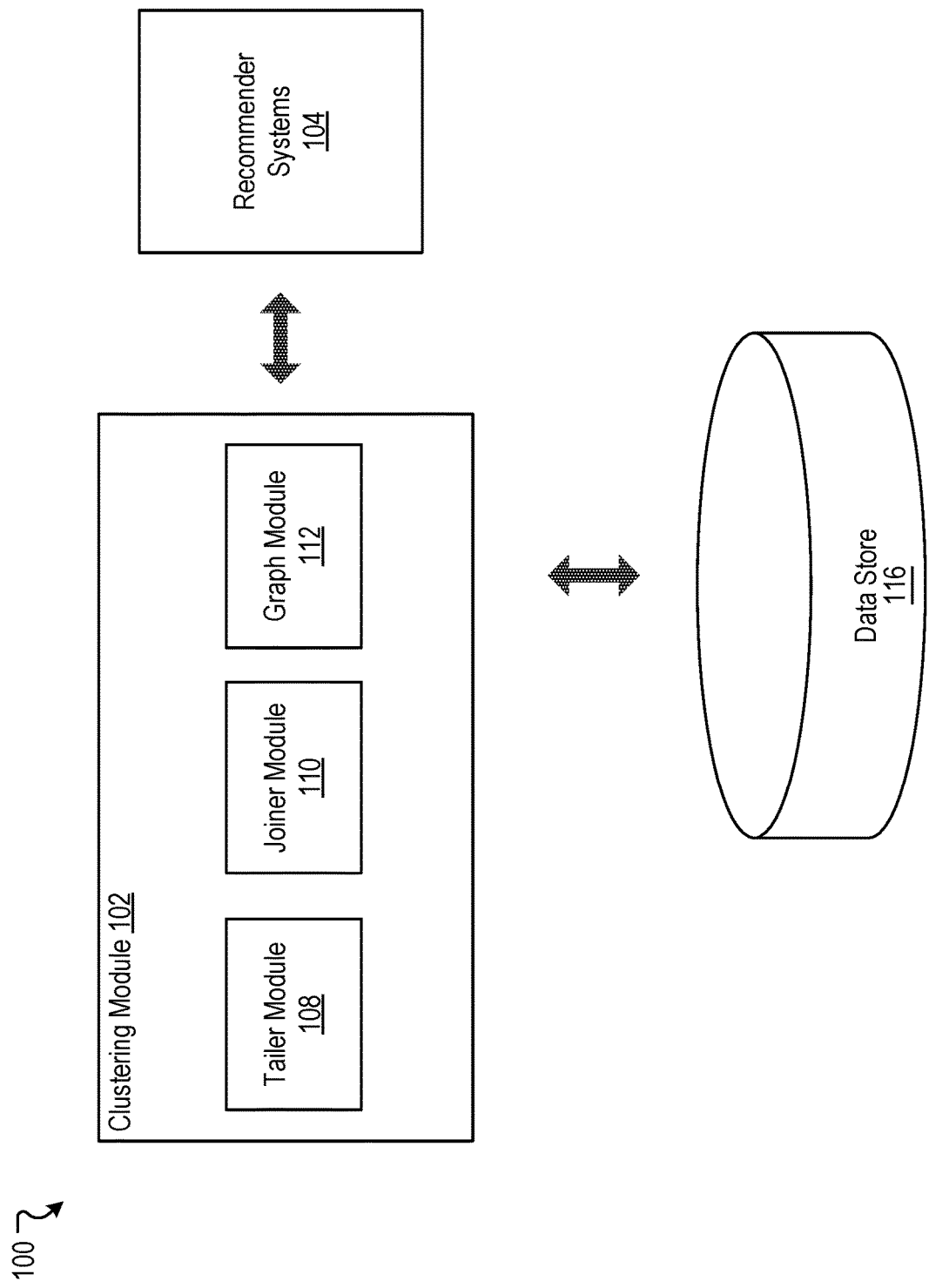
FIG. 1 illustrates an example clustering system, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Entity Clustering

People use computing devices (or systems) for a wide variety of purposes. Computing devices can provide different kinds of functionality. Users can utilize their computing devices to produce information, access information, and share information. In some cases, users can use their computing devices to generate and publish content postings. Content can include any combination of content types, such as text, images, videos, and audio. The content can be shared for consumption by others through a social networking system. The content can be shared in a variety of formats, such as pages of or posts to the social networking system.

The conventional presentation of content can entail many disadvantages. The social networking system may attempt to identify additional content that is of interest to the user. However, when presented to the user, the additional content may not be desirable to the user because they are not well matched with the interests of the user. In such circumstances, the user can be provided with content that the user deems unfamiliar, irrelevant, or worse. As a result, the user experience of the social networking system can suffer.

An improved approach to the presentation of additional content overcomes the foregoing and other disadvantages associated with conventional approaches. The present disclosure is a real time (or near real time) system that can be used to improve recommender systems that present content to a user. For example, with respect to a user, the present disclosure can collect the items (or entities) users have interacted (engaged) with in sequence. Noise reduction techniques can be applied to the collection of the items. Sequences can be aggregated together to form a graph of items with edge weights reflecting a count of transitions between two items. The edge weights in the graph can provide a transition probability from one item to another item. The edge weights can be rebalanced to optimize memory usage and to address rapid edge decay in certain circumstances. The transition probabilities can be used for clustering of items that can be used in real time (or near real time) by recommender systems to provide additional, relevant information to the user.

FIG. 1 illustrates an example system 100 including an example clustering module 102 configured to facilitate the determination of additional content by recommender systems 104 to present to a user of a social networking system, according to an embodiment of the present disclosure. The recommender systems 104, including user-to-item recommender systems and item-to-item recommender systems, can include one or more types of techniques for providing relevant information to the user in a social networking system. In some instances, the example system 100 can also include at least one data store 116.

The clustering module 102 can include a tailer module 108, a joiner module 110, and a graph module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the clustering module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the clustering module 102 can be implemented, in part or in whole, as software running on one or more computing devices or systems. In some embodiments, the clustering module 102 and data managed by the clustering module 102, such as graph data, can be distributed over an array of computing devices, such as servers, and sharding techniques can be used to localize related or connected data (e.g., connected nodes and associated edges in the graph) in one computing device to optimize speed and minimize latency. In some instances, the clustering module 102 can, in part or in whole, be implemented within or configured to operate in conjunction with a social networking system (or service), such as the social networking system 630 of FIG. 6. It should be understood that many variations are possible.

The tailer module 108 can access data relating to interaction (engagement) with the social networking system or other websites for which the social networking system acts as a platform. The data can be provided by a system that interfaces with front end servers to track in real time (or near real time) all interactions with items (entities). Items can include, for example, other users, groups, pages, hashtags, topics, links, photos, search terms, etc. Interactions can include, for example, production, clicking, viewing, navigating, etc. As some examples, interactions can relate to page visits, page likes, profile follows, URL shares, hashtag authoring, topic authoring, etc. The data can be log entries in the form of messages. In particular, the tailer module 108 can receive desired categories of the messages and extract information about interactions. The information can include, for example, identity of the user performing the interaction (User-Id), identity of an item with which user is interacting (Item-Id), the type of the item, the time of the interaction, and the location of the interaction. This information can be encoded in a message for consumption by the joiner module 110. The tailer module 108 can queue messages for consumption by the joiner module 110 in a first-in-first-out manner.

The joiner module 110 can collect interactions of active users. The joiner module 110 can maintain a time and space efficient indexed (or hash) table designed to support concurrent writes. In one example, the table can be keyed by a user (or associated User-Id). Each User-Id value can contain a sequence of items with which the user has interacted. The sequence can be referred to as a session. The items in the session can be ordered by recency of interaction with each item. In another example, the table can be keyed by a post (or associated post-ID). The joiner module 110 can maintain memory efficiency by limiting the size of the indexed table and the number of items with which the user has interacted. The joiner module 110 also can identify sources of noise and accordingly ignore or eliminate associated interactions. The joiner module 110 is discussed in more detail herein.

The graph module 112 can manage a multi-level graph reflecting user interaction with items and track transitions between the same type of items (homogeneous) and between different types of items (heterogeneous). The graph can be implemented as a time and space efficient indexed table designed to support concurrent writes. The graph module 112 can track transitions by a variety of metadata, such as by type of item and by location. The graph module 112 can perform a rebalancing technique relating to transition (edge) counts to optimize memory efficiency and to address rapid decay in certain circumstances. The graph module 112 can generate similarity scores based on transitions to facilitate the determination of clusters of items. The graph module 112 can generate clusters of the items according to the similarity scores and provide the clusters to the recommender systems 104. The graph module 302 is discussed in more detail herein.

The recommender systems 104 can include systems that select content for potential presentation to a user relating to, for example, a trending topic, page recommendations, group recommendations, search recommendations, and the like. The recommender systems 104 can be used in connection with underlying techniques that monitor activities on the social networking system. Such techniques can include, for example, co-visitation, co-interaction, co-production, and co-liking. The recommender systems 104 can provide relevant information for potential presentation to a user based on the clusters provided by the graph module 112.

The data store 116 can be configured to store and maintain various types of data associated with the clustering system 102 and the social networking system. The information associated with the social networking system can include data about users, social connections, social interactions, locations, geo-fenced areas, maps, places, events, groups, posts, communications, content, account settings, privacy settings, and various other types of data. In some implementations, the data store 116 can store information associated with users, such as user identifiers, user information, user specified settings, content produced by users, and various other types of user data. As shown in the example system 100, the clustering module 102 can be configured to communicate and/or operate with the data store 116.

Figure 2:
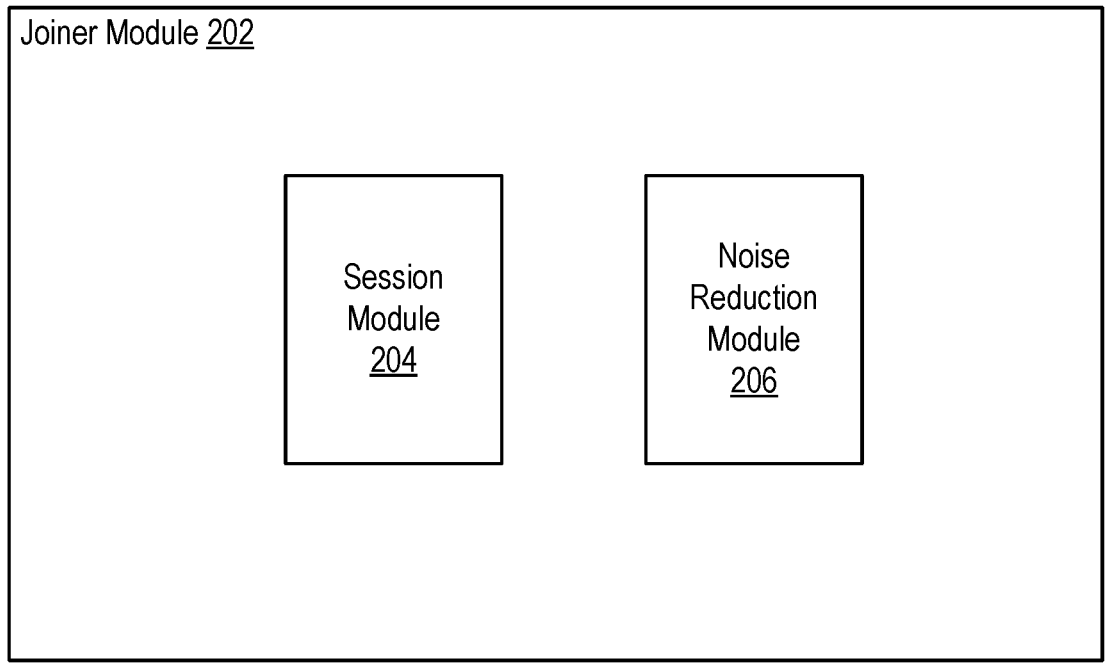
FIG. 2 illustrates an example joiner module, according to an embodiment of the present disclosure.

FIG. 2 illustrates an example joiner module 202, according to an embodiment of the present disclosure. In some embodiments, the joiner module 110 can be implemented by the joiner module 202. As shown in the example of FIG. 2, the joiner module 202 can include a session module 204 and a noise reduction module 206.

The session module 204 can join relevant interaction data to create sessions maintained as indexed tables. Each session may include all relevant interactions with items based on a key. The session module 204 can order the items based on recency. The items in a session may include the same type of items or may include different types of items. For example, the session module 204 can collect interactions based on a user in a session. In this regard, the user can visit a page, fan the page, post regarding the page, visit a group, and perform other interactions. These interactions can be included in a session associated with the user. As another example, the session module 204 can collect interactions based on an identification of a post (Post-ID). In this regard, if a user published a post having a hashtag and a URL, the hashtag and the URL can be joined on the Post-ID and included in a session associated with the Post-ID. The session module 204 can maintain sessions in a queue for provision to the graph module 112.

The session module 204 can maintain memory efficiency through various techniques. For example, the session module 204 can limit the users tracked to only active users. As another example, the session module 204 can limit the number of active users tracked to a selected maximum number of active users. When a new active user surfaces, the oldest active user may be dropped from tracking. In addition, the session module 204 can limit the number of interactions of each active user that are tracked to a maximum number of interactions. A circular list (counter) may be applied to limit the number of interactions to the maximum number.

The noise reduction module 206 can identify sources of noise and accordingly ignore or eliminate associated interactions according to a variety of techniques. The sources of noise can be reflected in interaction data and undesirably impact probabilities of transition for nodes and related clustering. The sources of noise can be automated third party processes responsible for spam, malware, or malicious activity on the social networking system.

In one technique, the noise reduction module 206 can determine whether a user is spending less than a threshold amount of time for each interaction (e.g., page visit). Spending relatively small amounts of time on interactions can be indicative of automated behavior and a third party process designed to scrape content from some or all of the pages of the social networking system. The threshold amount of time for each interaction can be based on a type of the item on which the interaction was performed. The threshold amount of time for each interaction can be selected by an administrator of the social networking system. When interactions do not equal or exceed the threshold amount of time, the noise reduction module 206 can blacklist the User-ID associated with the interactions. All interactions associated with the User-ID can be ignored by the joiner module 110 and not used in updating the graph.

In another technique, the noise reduction module 206 can determine whether a user is active for more than a threshold amount of time for each session of interactions. Spending relatively large amounts of time for each session can be indicative of automated behavior and usage of the social networking system that is not intended. The threshold amount of time for each session can be selected by an administrator of the social networking system. When a session of a user equals or exceeds the threshold amount of time for each session, the noise reduction module 206 can black list the User-ID associated with the interactions. All interactions associated with the User-ID can be ignored by the joiner module 110 and not used in updating the graph.

In yet another technique, the noise reduction module 206 can determine whether a user has engaged in a cycle (pattern) of interaction. Cycles of interaction can be indicative of automated behavior and usage of the website of the social networking system that is not intended. The noise reduction module 206 can select a predetermined number of interactions (e.g., page visits) of a user. The predetermined number of interactions can be selected by an administrator of the social networking system. For example, the noise reduction module 206 can determine the page IDs of a selected number of consecutive pages that were visited by the user. The noise reduction module 206 can analyze the historical page visits associated with the user. If the noise reduction module 206 detects the user visited the same consecutive pages on another occasion, the noise reduction module can black list the User-ID associated with the interactions. All interactions associated with the User-ID can be ignored by the joiner module 110 and not used in updating the graph.

Figure 3:
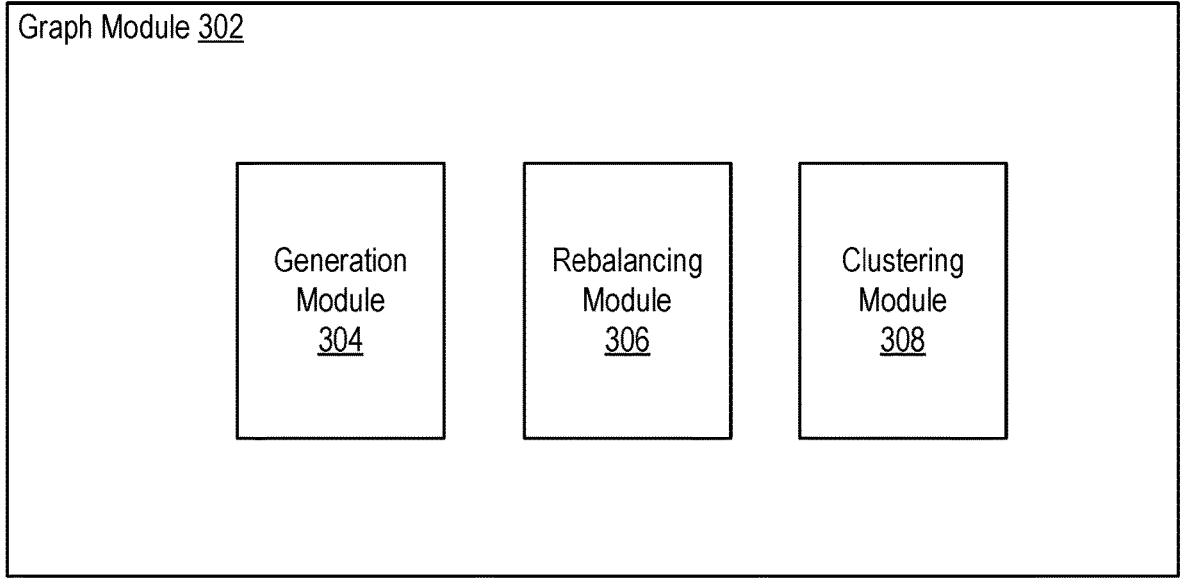
FIG. 3 illustrates an example graph module, according to an embodiment of the present disclosure.

FIG. 3 illustrates an example graph module 302, according to an embodiment of the present disclosure. The graph module 302 can be configured to manage a graph reflecting interaction with items and track transitions between items. In some embodiments, the graph module 112 can be implemented by the graph module 302. The graph module 302 can include a generation module 304, a rebalancing module 306, and a clustering module 308.

The generation module 304 is configured to build a graph representing the items and interactions. The items are represented by nodes in the graph and the transitions between items are represented by edges in the graph. The generation module 304 can continuously update edges in the graph. The edges of a node can be incoming, outgoing, or bi-directional. Each edge can be added to the graph by a count of integer values. The graph can be a multi-level graph reflecting interaction between the same type of items (homogeneous) and between different types of items (heterogeneous). The generation module 304 can track transitions by a variety of metadata, such as by type of item and by location.

The graph can reflect a wide array of interactions involving different items. For example, if a user visited a first page, and then visited a second page, and then visited a profile, and then visited a group, the generation module 304 can appropriately reflect the items and interactions in the graph. A node can be created for each of the first page, the second page, the profile, and the group. Edges, or transitions, can be created among the nodes. In particular, a transition from the first page to the second page can be created, a transition between the second page to the profile can be created, and a transition from the profile to the group. For a multitude of users whose interactions may involve various interactions with the first page, the second page, the profile, and the group, corresponding transitions may be created among the associated nodes. Not all interactions with the first page, the second page, the profile, and the group may proceed in the stated sequence. For instance, some users may visit the second page, and then visit the first page, and then visit the profile, and then visit the group. In another instance, some users may visit the second page, and then visit the group, and then visit the first page, but not visit the first page.

As another example, if a post (e.g., status update, comment) is published, the text of the post may result in the generation of, for example, topic tags, hashtags, and URLs. The generation module 304 can appropriately reflect the topic tags, the hashtags, and the URLs in the graph. Nodes and transitions can be created for the topic tags, the hashtags, and the URLs.

The generation module 304 can generate transitions based on the different interactions and generated relationships between items. Over a threshold number of users and generated relationships over time, the transitions, when aggregated, can converge on certain ratios or transition probabilities with respect to one another. The transition probabilities can be used to cluster items and facilitate the selection of relevant information by the recommender systems 104.

The rebalancing module 306 can manage edges in the graph to optimize the use of memory for storage of the graph and to address rapid decay in certain circumstances involving, for example, trending. The rebalancing module 306 can apply a decay (reduction) to the number of edges between a node and its connected nodes in a graph in certain circumstances. In some embodiments, the rebalancing module 306 can count all of the edges for the node. If the total number of edges for the node is greater than or equal to a threshold total number of edges, the rebalancing module 306 can decay the total number of edges.

The decay can in whole or in part maintain the probabilities of transition reflected in the edges prior to the decay. The probability of transition associated with a node and a particular connected node can be represented by the count of transitions between the node and the particular connected node (i.e., weight of the edges between the node and the particular connected node) divided by the sum of the count of transitions between the node and all of the connected nodes (i.e., weight of all edges between the node and all connected nodes). The rebalancing module 306 can determine a constant value between zero and one. Each count of transitions between the node and a connected node can be multiplied by a constant value, such as a fraction. The product of the count of transitions between the node and a connected node and the constant value can generate a weight, which is rounded down to the nearest integer. Any connected node associated with a weight equal to zero can be removed from the graph.

In some embodiments, undesirable rapid edge decay can be addressed. Such rapid decay can occur in connection with trending items. A constant value can be selected as a function of transition probabilities to preserve the top k transition probabilities above a threshold value through edge decay. The threshold value can be a minimum percentage of the weight of the edges of all connected nodes. When the transition probability of the k-th largest connected node by weight among the connected nodes is greater than the threshold value, the constant value is equal to the threshold value divided by the transition probability of the k-th largest connected node by weight among the connected nodes. The constant value can be multiplied by each of the transition probabilities associated with the node and each of the connected nodes. The product of the constant value and each of the transition probabilities can generate a new weight between the node and each of the connected nodes. When the transition probability of the k-th largest connected node by weight among the connected nodes is not greater than the threshold value, the constant value can be any default value.

The clustering module 308 can generate similarity scores based on transitions to facilitate the determination of clusters of items. The clustering module 308 can cluster items based on similarity scores and the clusters can be provided to the recommender systems 104 for the selection and presentation of relevant information to users. The clusters of items can include items of the same type and items of different type. The similarity scores can reflect a degree of similarity between two items based on the edges connecting the items.

With respect to items of the same type, the clustering module 308 can generate clusters based on the similarity scores of the items. The similarity score between an item and a particular, connected item can be represented by the count of transitions between a node associated with the item and a node associated with the particular, connected item (i.e., weight of the particular node) divided by the sum of the count of transitions between the node and all of the nodes connected to the node (i.e., weight of all connected nodes). The clustering module 308 also can determine a similarity score between an item and a cluster. To determine the similarity score between the item and the cluster, the clustering module 308 can select any item in the cluster or an item in the cluster that is representative of the items in the cluster. The similarity score between the item and the cluster can be based on the similarity score between the item and the item in the cluster.

In some embodiments, the similarity score can be determined in a manner that applies a threshold value to account for random transitions between items that are not significant in the determination of clusters of items. The threshold value may be a suitable percentage of the total number of transitions of the item. When the total count of transitions between the item and another item connected to the item is less than or equal to the threshold value, then the similarity score between the item and the other item can be set to zero. A similarity score of zero indicates that two items are not related and that the two items should not be included in the same cluster.

Two items can be assigned to a cluster based on the similarity scores between the two items. When the similarity score between the two items is greater than or equal to a threshold value, the two items can be included in the same cluster. Likewise, when the similarity score between an item and a cluster is greater than or equal to the threshold value, the item can be determined to be sufficiently similar to the cluster to warrant assignment of the item in the cluster.

With respect to items of different type, clusters can be generated based on bi-directional agreement between clusters and internal cohesion of the clusters. For example, assume a set of items of both a first type and a second type and the existence of a first cluster. Assume further that a first item in the set is of the first type and that the first item is representative of the first cluster. The clustering module 108 can determine whether a second item of the second type in the set is to be included in the first cluster or included as part of a new cluster. The determination can be based on the extent to which the second item interacts (e.g., co-visits) with the first item in a bi-directional manner and on the internal cohesion of the first cluster. If the second item interacts with the first item in a bi-directional manner to an extent that is greater than or equal to a threshold value, such interaction with the first item is greater than interaction with other clusters, and internal cohesion of the first cluster satisfies a threshold value, then the second item can be included in the cluster of the first item. Otherwise, the second item is not included in the cluster including the first item. In this case, the second item can be included in a new second cluster.

The recommender systems 104 can be provided with clusters associated with an item with which the user is interacting. Based on the clusters, the recommender systems 104 can identify additional items of relevant information for potential presentation to the user. The recommender systems 104 may select the additional items based on the transition probabilities (or similarity scores) with respect to the node associated with the item. For example, the recommender systems 104 may select a threshold number of connected items having the highest transition probabilities with respect to an item for potential provision to the user.

FIG. 4 illustrates a first example method 400, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can generate session information based on information regarding items of a plurality of item types associated with interactions performed by active users of a social networking system. At block 404, the method 400 can generate a graph based on the session information. At block 406, the method 400 can assign at least a first item of the items to a cluster based on similarity between the item and the cluster. At block 408, the method 400 can provide the cluster to a recommender system to facilitate selection of relevant information for potential presentation to a user. Other suitable techniques are possible.

FIG. 5 illustrates a second example method 500, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can generate session information based on information regarding items of a plurality of item types associated with interactions performed by active users of a social networking system. At block 504, the method 500 can limit the information regarding items of a plurality of item types by at least one of a number of the active users and a number of interactions associated with the active users. At block 506, the method 500 can remove noise in the session information based on at least one of spending less than a first threshold amount of time for each interaction, activity for more than a second threshold amount of time for a session, and engagement in a cycle of interaction. At block 508, the method 500 can generate a graph based on the session information. At block 510, the method 500 can rebalance edges of a node of the graph to optimize memory usage in storage of the graph. At block 512, the method 500 can determine a similarity score between a first item of the items and a representative item of a cluster and determine whether the similarity score satisfies a threshold value. At block 514, the method 500 can assign the first item of the items to the cluster based on similarity between the item and the cluster. At block 516, the method 500 can provide the cluster to a recommender system to facilitate selection of relevant information for potential presentation to a user. Other suitable techniques are possible.

Social Networking System—Example Implementation

Figure 6:
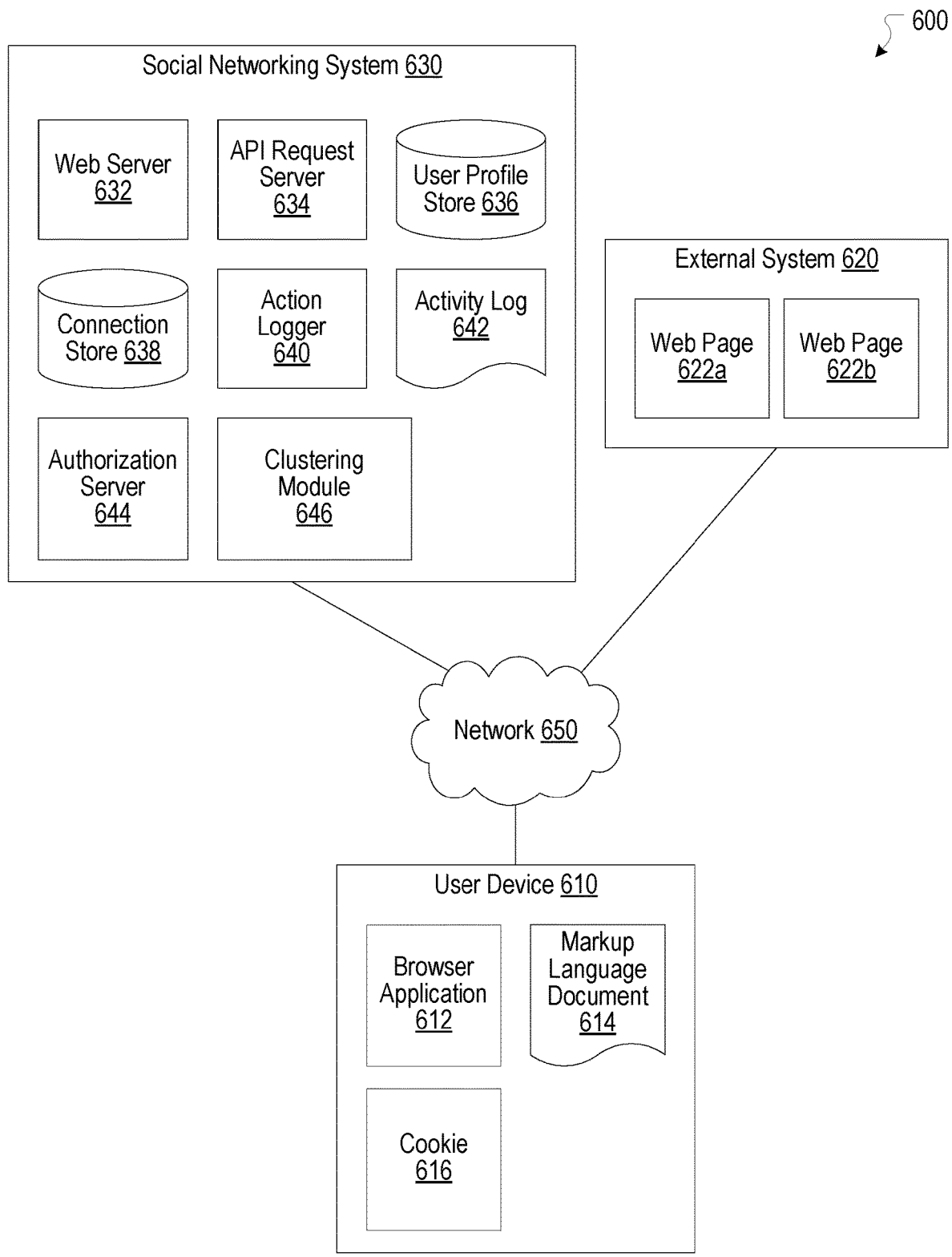
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a clustering module 646. The clustering module 646 can be implemented with the clustering module 102.

Hardware Implementation

Figure 7:
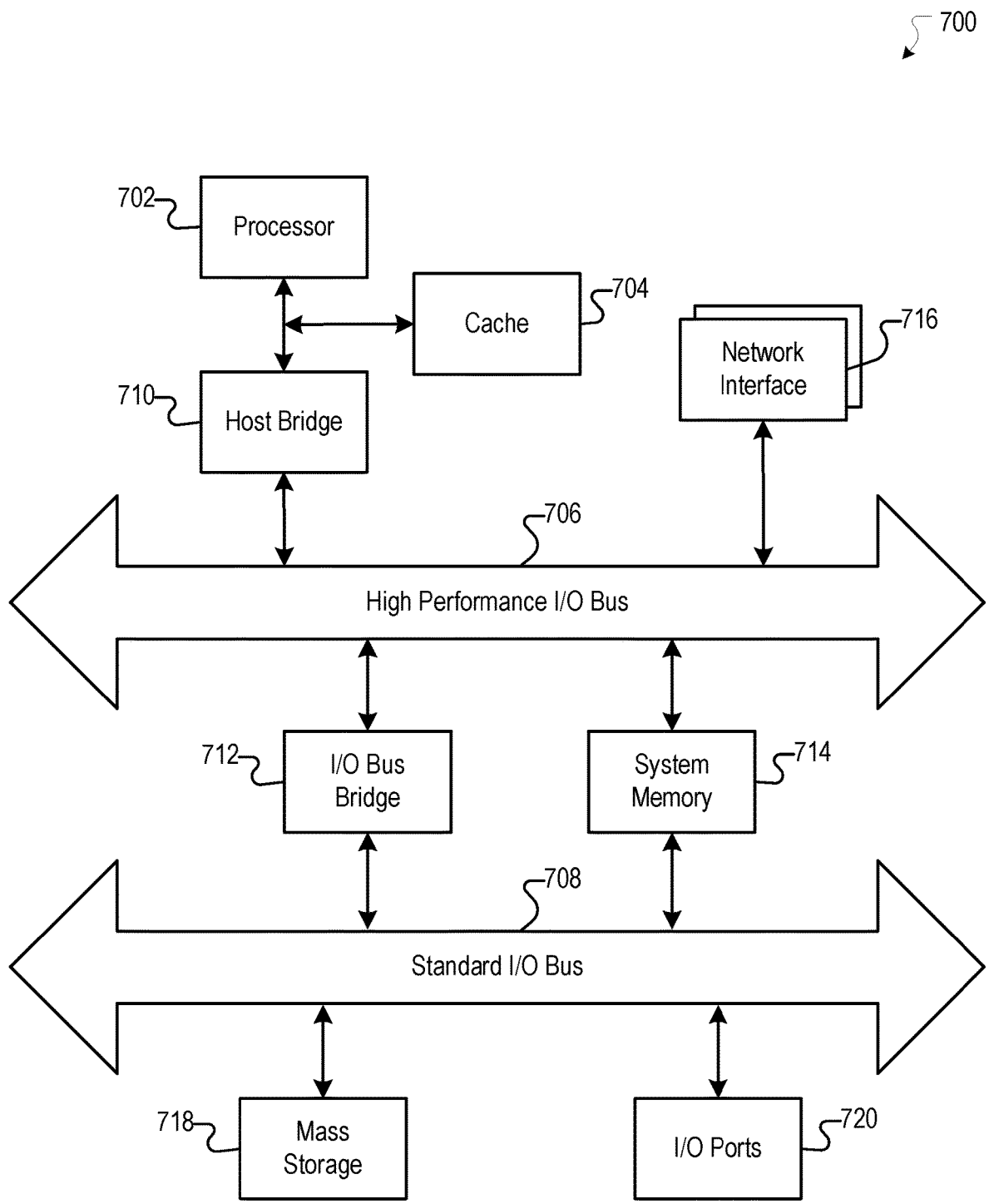
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
generating, by a computing system, a graph based on session information associated with user interaction with a plurality of items on a system, wherein the graph comprises a plurality of nodes and a plurality of edges connecting the plurality of nodes, each node of the plurality of nodes is associated with at least one item of the plurality of items, and each edge is associated with at least one transition count;
removing, by the computing system, one or more edges connected to a first node of the plurality of nodes, wherein the removing one or more edges connected to the first node comprises:
for each node connected to the first node, multiplying a transition count associated with each edge by a constant value between zero and one to determine a weight for each edge,
rounding each weight for each edge to a nearest integer to determine a rounded weight for each edge, and
removing any edges with a rounded weight equal to zero;
assigning, by the computing system, at least a first item of the plurality of items to a cluster based on the graph; and
providing, by the computing system, the cluster to a recommender system to facilitate selection of relevant information for potential presentation to a user.

2. The computer-implemented method of claim 1, further comprising generating the session information.

3. The computer-implemented method of claim 2, wherein the generating the session information comprises:
generating a message for each user interaction with an item of the plurality of items on the system, wherein each message comprises:
user information identifying a user performing the user interaction,
item information identifying the item, and
at least one of: item type information identifying an item type associated with the item, a time associated with the user interaction, and a location associated with the user interaction.

4. The computer-implemented method of claim 3, wherein
the session information comprises a plurality of sessions, and
each session of the plurality of sessions is associated with a particular user or a particular item of the plurality of items.

5. The computer-implemented method of claim 4, wherein the session information is maintained in one or more indexed tables designed to support concurrent writes.

6. The computer-implemented method of claim 5, wherein the one or more indexed tables comprise, for each user of a plurality of users, an ordered sequence of items with which the user has interacted, wherein the items are ordered by recency of interaction with each item.

7. The computer-implemented method of claim 2, wherein the session information is associated with a plurality of users, and the generating the session information comprises:
  determining that the plurality of users exceeds a maximum number of users; and
  removing session information associated with an oldest active user of the plurality of users.

8. The computer-implemented method of claim 2, wherein the session information is associated with a plurality of users, and each user of the plurality of users is associated with one or more user interactions, and the generating the session information comprises:
  determining that a first user of the plurality of users is associated with a plurality of interactions that exceeds a maximum number of interactions; and
  removing session information associated with one or more interactions of the plurality of interactions based on the determining that the plurality of interactions associated with the first user exceeds a maximum number of interactions.

9. The computer-implemented method of claim 1, wherein the assigning at least the first item of the plurality of items to the cluster based on the graph comprises:
  determining a similarity score between the first item and a representative item of the cluster; and
  determining whether the similarity score satisfies a threshold value.

10. The computer-implemented method of claim 1, wherein the assigning at least the first item of the plurality of items to the cluster based on the graph comprises:
  determining bi-directional agreement between the first item and a representative item of the cluster based on interactions between the first item and the representative item of the cluster.

11. A system comprising:
  at least one processor; and
  a memory storing instructions that, when executed by the at least one processor, cause the system to perform:
  generating a graph based on session information associated with user interaction with a plurality of items on the system, wherein the graph comprises a plurality of nodes and a plurality of edges connecting the plurality of nodes, each node of the plurality of nodes is associated with at least one item of the plurality of items, and each edge is associated with at least one transition count;
  removing one or more edges connected to a first node of the plurality of nodes, wherein the removing one or more edges connected to the first node comprises:
    for each node connected to the first node, multiplying a transition count associated with each edge by a constant value between zero and one to determine a weight for each edge,
    rounding each weight for each edge to a nearest integer to determine a rounded weight for each edge, and
    removing any edges with a rounded weight equal to zero;
  assigning at least a first item of the plurality of items to a cluster based on the graph; and
  providing the cluster to a recommender system to facilitate selection of relevant information for potential presentation to a user.

12. The system of claim 11, wherein the instructions, when executed by the at least one processor, further cause the system to perform: generating the session information.

13. The system of claim 12, wherein the generating the session information comprises:
  generating a message for each user interaction with an item of the plurality of items on the system, wherein each message comprises:
    user information identifying a user performing the user interaction,
    item information identifying the item, and
    at least one of: item type information identifying an item type associated with the item, a time associated with the user interaction, and a location associated with the user interaction.

14. The system of claim 13, wherein
  the session information comprises a plurality of sessions, and
  each session of the plurality of sessions is associated with a particular user or a particular item of the plurality of items.

15. The system of claim 14, wherein the session information is maintained in one or more indexed tables designed to support concurrent writes.

16. A non-transitory computer-readable storage medium including instructions that, when executed by at least one processor of a computing system, cause the computing system to perform a method comprising:
  generating a graph based on session information associated with user interaction with a plurality of items on a system, wherein the graph comprises a plurality of nodes and a plurality of edges connecting the plurality of nodes, each node of the plurality of nodes is associated with at least one item of the plurality of items, and each edge is associated with at least one transition count;
  removing one or more edges connected to a first node of the plurality of nodes, wherein the removing one or more edges connected to the first node comprises:
    for each node connected to the first node, multiplying a transition count associated with each edge by a constant value between zero and one to determine a weight for each edge,
    rounding each weight for each edge to a nearest integer to determine a rounded weight for each edge, and
    removing any edges with a rounded weight equal to zero;
  assigning at least a first item of the plurality of items to a cluster based on the graph; and
  providing the cluster to a recommender system to facilitate selection of relevant information for potential presentation to a user.

17. The non-transitory computer-readable storage medium of claim 16, wherein the instructions, when executed by at the least one processor of the computing system, further cause the computing system to perform: generating the session information.

18. The non-transitory computer-readable storage medium of claim 17, wherein the generating the session information comprises: generating a message for each user interaction with an item of the plurality of items on the system, wherein each message comprises:
  user information identifying a user performing the user interaction,
  item information identifying the item, and
  at least one of: item type information identifying an item type associated with the item, a time associated with the user interaction, and a location associated with the user interaction.

19. The non-transitory computer-readable storage medium of claim 18, wherein
the session information comprises a plurality of sessions, and
each session of the plurality of sessions is associated with a particular user or a particular item of the plurality of items.

20. The non-transitory computer-readable storage medium of claim 19, wherein the session information is maintained in one or more indexed tables designed to support concurrent writes.

\* \* \* \* \*